United States Patent
Kubo et al.

[11] Patent Number: 5,563,860
[45] Date of Patent: Oct. 8, 1996

[54] OPTICAL DISK DRIVE

[75] Inventors: Mitumasa Kubo, Tokyo; Kiyoshi Shidara, Saitama-ken, both of Japan

[73] Assignee: Teac Corporation, Tokyo, Japan

[21] Appl. No.: 250,450

[22] Filed: May 27, 1994

[30] Foreign Application Priority Data

May 28, 1993 [JP] Japan ................... 5-127198

[51] Int. Cl.$^6$ .................................... G11B 7/00
[52] U.S. Cl. ................... 369/50; 369/48; 369/58
[58] Field of Search .................... 369/48, 47, 49, 369/50, 54, 58, 59, 32; 360/27, 48, 50, 73.03

[56] References Cited

U.S. PATENT DOCUMENTS

| | | | |
|---|---|---|---|
| 4,894,734 | 1/1990 | Fischler et al. | 360/27 X |
| 5,138,599 | 8/1992 | Fukushima et al. | 369/58 X |
| 5,245,595 | 9/1993 | Yasukawa | 360/73.03 X |
| 5,436,878 | 7/1995 | Yamaguchi et al. | 369/50 X |

FOREIGN PATENT DOCUMENTS 4-129068  4/1992  Japan .

*Primary Examiner*—Georgia Y. Epps
*Assistant Examiner*—Muhammad N. Edun
*Attorney, Agent, or Firm*—Michael N. Meller

[57] ABSTRACT

An optical disk drive for recording information on or retrieving information from an optical disk having a plurality of zones including a different number of sectors includes a zone identifying unit for identifying a current zone in which the optical head is located, and a synchronizing signal generation unit for generating a synchronizing signal of a frequency corresponding to the current zone, wherein the synchronizing signal is used for reading a retrieved signal from the optical disk.

8 Claims, 8 Drawing Sheets

OPTICAL DISK DRIVE

BACKGROUND OF THE INVENTION

1. Field of the Invention

This invention generally relates to disk drives, and more particularly to an optical disk drive having the function of detecting the sector mark and the address of a sector recorded on an MCAV optical disk.

2. Description of the Prior Art

A various kinds of recording formats for the optical disk drive have been proposed in order to increase the disk memory volume and in order for information to be reliably recorded on or retrieved from a target address of the disk. These formats are CLV (Constant Linear Velocity), CAV (Constant Angular Velocity), MCLV (Modified CLV), and MCAV (Modified CAV) when classified according to their sector arrangement. MCLV is a CLV with the rotation rate control of the spindle motor being simplified. MCAV is a CAV with its memory volume increased.

On a CAV disk, there are the same number of sectors in each track from the innermost side to the outermost side of the disk. Since the disk is rotated at a predetermined constant rate, the frequency of a signal retrieved from the disk should be constant over the entire disk. In order for information to be recorded on or retrieved from the disk, a sector mark located at the beginning of each sector is detected by sampling a retrieved signal with a reference clock of a predetermined frequency, and a read clock is locked by means of the PLL (Phase Locked Loop) and the like to a signal retrieved from a portion called VFO, which follows the sector mark within the sector. Then, the sector address recorded in the portion following VFO is read by using the read clock which has been already locked, and thereby the sector address is detected. The sector mark is a mark for indicating the beginning of the sector and must be able to be detected by a reference clock of a predetermined frequency so that the sector mark has a longer mark length and a stronger signal output or is recorded with a different pattern than other signals. The signal recorded on VFO is a data pattern designed to be used for locking a read clock to a retrieved signal frequency so as to ensure that signals can be read even if there are variations in the disk rotation rate.

For both the CAV disk and the MCAV disk, the portion at the beginning of a sector comprising the sector mark, VFO, the sector address, and etc., is called address portion of the sector, and the part of the address portion other than the sector mark is referred as ID area. Typically, there are a plurality of the same ID areas following a single sector mark in the sector to make sure that the disk drive can read the sector address without errors.

In the contrast to the CAV disk, the number of sectors in one track on an MCAV disk gets larger as the track gets nearer to the perimeter of the disk, which can achieve an increase in memory volume of the disk. FIG. 1 shows the sector arrangement on a disk which is formatted according to MCAV. A spiral shape track 12 is formed on a disk 11, and there are a different number of sectors for each zone, i.e., a zone 13a, a zone 13b, ..., with the total number of the zones on the disk being several to several dozens depending on the type of the disk. Since a disk for MCAV is rotated at a predetermined constant rate, a read clock frequency for recording and retrieving is different for each zone, and should be increased progressively as a zone gets nearer to the perimeter of the disk.

In order to start up an MCAV disk, i.e., to make an MCAV disk ready to record or retrieve information, with a CAV type disk drive, the disk drive moves its head to a predetermined position on the disk, and starts reading a zone of this known position with a read clock of a predetermined frequency. Another method of starting up an MCAV disk with a CAV type disk drive is to progressively change the read clock frequency, and to start reading at the point where this read clock frequency corresponds to the frequency of signals recorded on the disk. These methods, however, cannot start up a disk and detect the address of a sector within such a short period of time that the address can be detected at the first sector encountered.

Accordingly, there is a need for a device in the field of the MCAV disk drive which can detect the address of the first encountered sector by reducing the time required for starting up the disk.

SUMMARY OF THE INVENTION

Accordingly, it is a general object of the present invention to provide an optical disk drive which satisfies the need described above.

It is another and more specific object of the present invention to provide an optical disk drive which can start up an MCAV disk and can detect the address of a sector within such a short period of time that the address can be detected at the first sector encountered.

It is another object of the present invention to provide an optical disk drive which comprises zone identifying means for identifying a current zone in which an optical head is located, and synchronizing signal generation means for generating a synchronizing signal of a frequency corresponding to the current zone, wherein the synchronizing signal is used for reading a retrieved signal from the optical disk. According to the optical disk drive of the present invention, it is possible to detect the address of the first encountered sector.

In a preferred embodiment of the present invention, the synchronizing signal generation means comprises a phase locked loop circuit which generates a synchronizing signal and includes a plurality of loop filters having different frequency characteristics, and selecting means for selecting one of the plurality of loop filters on the basis of the current zone position of the optical head. Thereby, the phase locked loop circuit can be locked to a retrieved signal for a wide range of frequencies so that the disk drive of the present invention can detect the address of a sector located in any zone over the entire disk surface.

Other objects and further features of the present invention will be apparent from the following detailed description when read in conjunction with the accompanying drawings.

DESCRIPTION OF THE PREFERRED EMBODIMENTS

Figure 2:
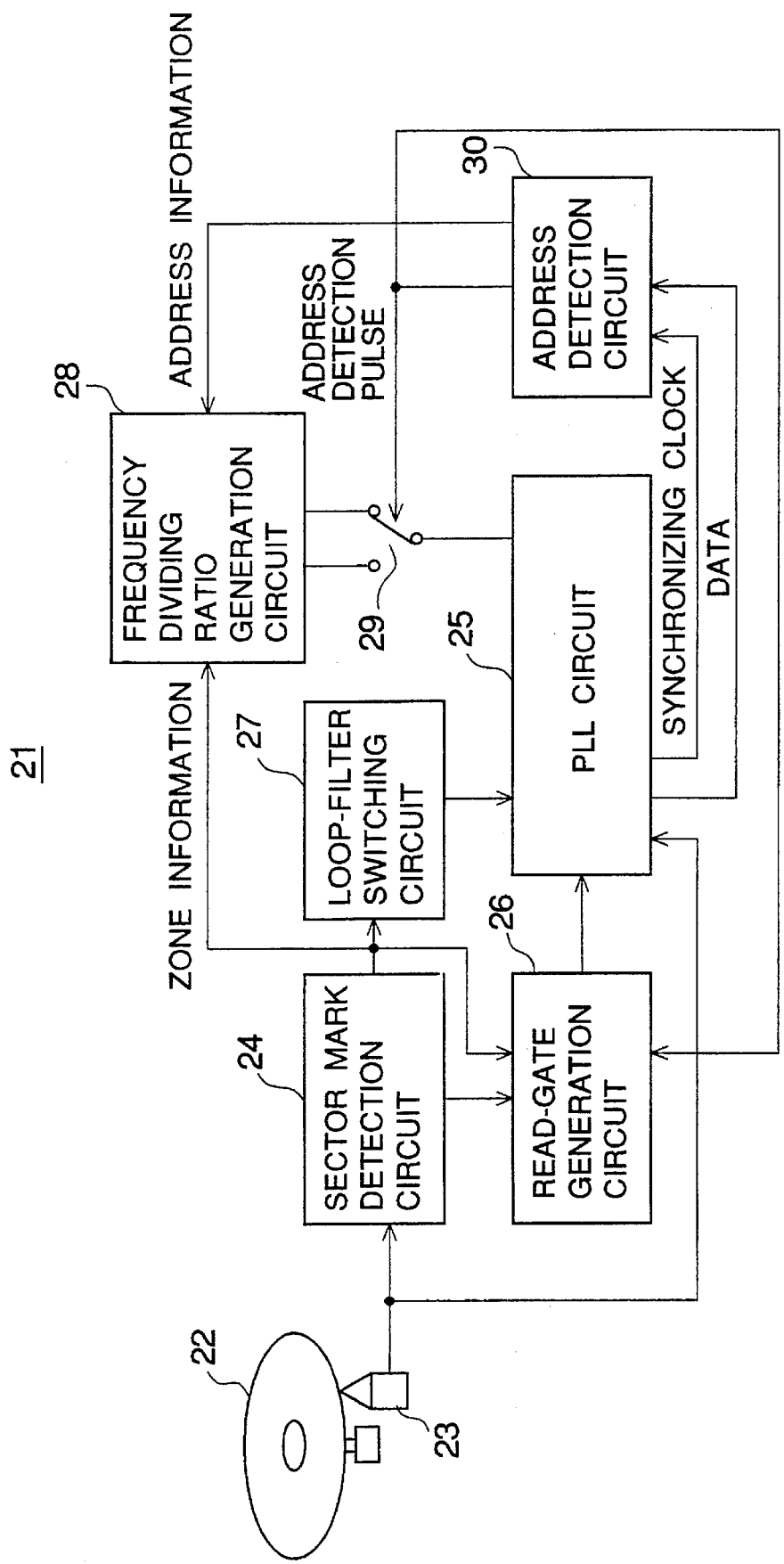
FIG. 2 is a block diagram of a preferred embodiment of the present invention.

FIG. 2 is a block diagram of the preferred embodiment of the present invention. An optical disk drive 21 in FIG. 2 shows only a part which detects the address of sectors, and does not show a part for recording and retrieving data, which is the same as in the prior art. The optical disk drive 21 comprises an optical disk 22, an optical head 23, a sector mark detection circuit 24, a PLL circuit 25, a read-gate generation circuit 26, a loop-filter switching circuit 27, a frequency dividing ratio generation circuit 28, a switching part 29, and an address detection circuit 30.

Figure 1:
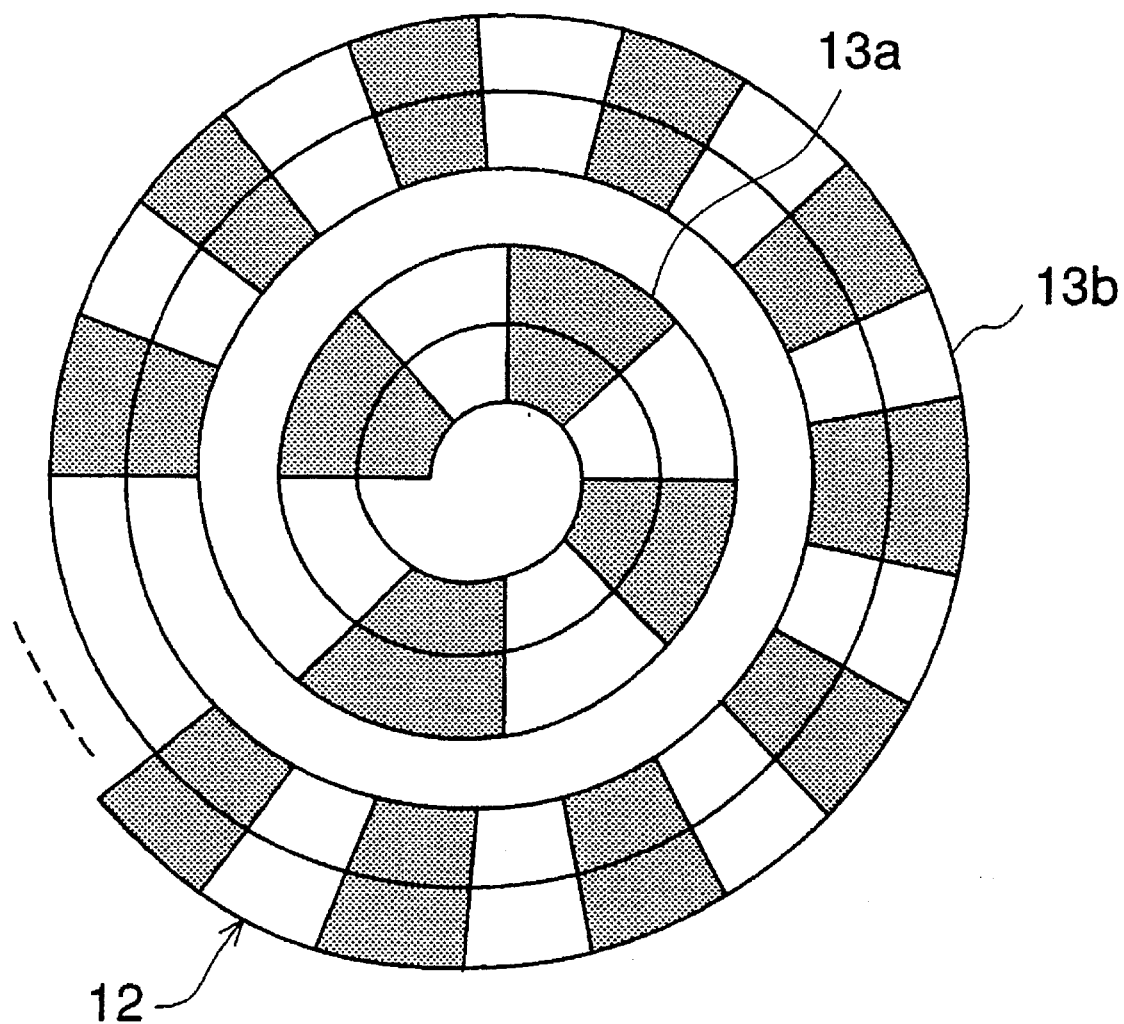
FIG. 1 is an illustrative drawing showing the sector arrangement of an MCAV optical disk.

The optical disk 22 is an MCAV type as shown in FIG. 1, and has a predetermined number of zones including a different number of sectors. Each sector has an address portion which is marked at the beginning by the sector mark therein. In the preferred embodiment of the present invention, the address portion of each sector has at least three ID areas, following the sector mark, each of which includes VFO, AM (Address Mark), its sector address, and etc.

In FIG. 1, signals recorded on the optical disk 22 are retrieved by the optical head 23, and the retrieved signal is provided for the sector mark detection circuit 24 and the PLL circuit 25. The sector mark detection circuit 24 detects a sector mark from the retrieved signal, and sends a sector mark detection pulse to the read-gate generation circuit 26 along with other signals which will be described later. Also, the sector mark detection circuit 24 identifies the current zone position on the disk and generates zone information, which is sent to the read-gate generation circuit 26 for providing a read-gate signal for the PLL circuit 25. The zone information is also sent to the loop-filter switching circuit 27 for switching loop-filters in the PLL circuit 25, and to the frequency dividing ratio generation circuit 28 for changing the frequency dividing ratio of the frequency divider in the PLL circuit 25.

The read-gate generation circuit 26 opens the read gate of the PLL circuit 25 upon receiving a sector mark detection pulse from the sector mark detection circuit 24, and thereby the PLL circuit 25 starts reading a retrieved signal from the optical head 23.

The loop-filter switching circuit 27 selects one loop-filter from a plurality of loop-filters in the PLL circuit 25 on the basis of the zone information provided by the sector mark detection circuit 24 so that the PLL circuit 25 can be locked to a retrieved signal from the optical disk 22. The role and functions of those loop-filters and the description of the PLL circuit 25 will be discussed later. In this embodiment, the number of loop-filers is two, and the loop-filter switching circuit 27 determines whether the position of the current zone is located in the inner half or the outer half of the disk, i.e., whether the retrieved signal is in the frequency range of the lower half or the higher half. The loop-filter switching circuit 27 selects the high frequency filter if the current zone corresponds to the frequency range higher than 20 MHz, which is used as a boundary frequency in this embodiment, and selects a low frequency filter if the current zone corresponds to the frequency range lower than 20 MHz.

The frequency dividing ratio generation circuit 28 determines the frequency dividing ratio of the frequency divider in the PLL circuit 25 on the basis of the zone information provided by the sector mark detection circuit 24 or of the address information provided by the address detection circuit 30 so that the PLL circuit 25 can be locked to a retrieved signal of the optical disk 22. A resulting signal of the frequency dividing ratio is sent via a connection between the frequency dividing ratio generation circuit 28 and the PLL circuit 25.

By using a loop-filter and a frequency dividing ratio appropriate for a retrieved signal from the optical disk 22, the PLL circuit 25 locks itself to the retrieved signal, and outputs a data signal and a synchronizing clock for this data signal. Then, the address detection circuit 30 reads the address information recorded in the ID area of the address portion of the current sector by using the data signal and the synchronizing clock provided by the PLL circuit 24.

Figure 3:
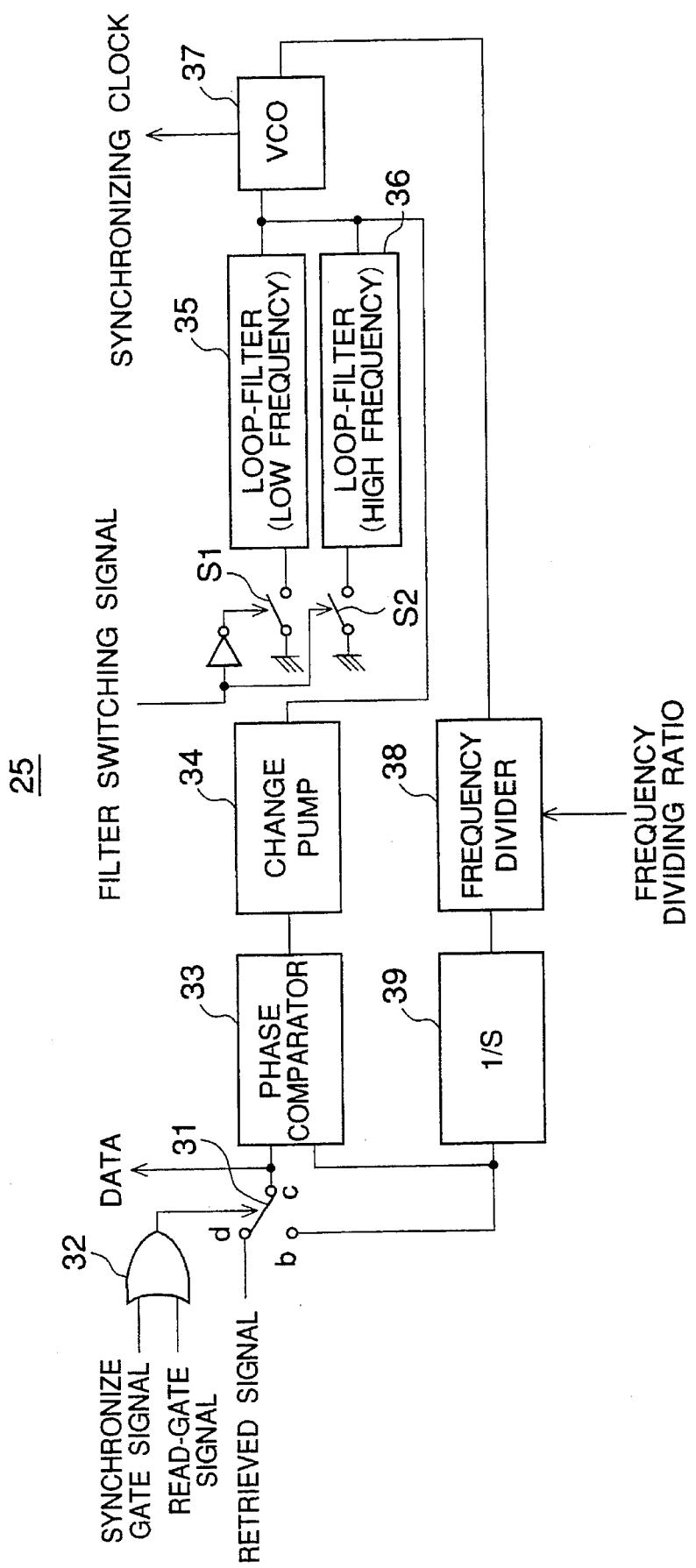
FIG. 3 is a block diagram of the PLL circuit of FIG. 2.

A block diagram of the PLL circuit 25 is shown in FIG. 3. The PLL circuit 25 comprises a switching part 31, an OR gate 32, a phase comparator 33, a charge pump 34, a loop-filter 35 and 36, a VCO (Voltage Controlled Oscillator) 37, a frequency divider 38, and an integrator 39. In FIG. 3, the OR gate 32 operates the switching part 31. The OR gate 32 is provided with a read-gate signal from the read-gate generation circuit 26 and a synchronize-gate signal from a CPU (Central Processing Unit) which is not shown. When one of these two signals is enabled, the switching part 31 is connected to node a, and the phase comparator 33 of the PLL circuit 25 receives a retrieved signal as one of its two inputs. When both read-gate and synchronize-gate signals are disabled, the switching part 31 is connected to node b, and the phase comparator 33 receives the same loop signal of the PLL circuit 25 at its two inputs. The read-gate signal should be turned on when the retrieved signal is used for detecting the sector address, and the synchronize-gate signal should be turned on when the retrieved signal is read from the data portion of the sector.

For a brief description of the operation of the PLL circuit 25 shown in FIG. 3, the VCO 37, as a starting point, oscillates at a frequency dependent on its input voltage, and this frequency is divided at the frequency divider 38. Then, the signal of this divided frequency is integrated, and the resulting signal and a retrieved signal provided externally are provided for the phase comparator 33. The phase comparator 33 outputs a voltage signal proportional to the phase difference between the two input signals, and this voltage signal is amplified by the charge pump 34. This amplified voltage signal is applied to the VCO 37 via either one of the two loop filters, which closes the loop having started herein with the input voltage signal to the VCO 37. In this closed loop in a stable condition, basically, the VCO 37 oscillates at such a constant frequency that the two signals compared by the phase comparator 33 have the same frequency and a constant phase difference. In this condition, the PLL circuit 25 is locked to an input retrieved signal, outputs this input retrieved signal as a data signal, and provides a synchronizing clock for reading this data signal.

In FIG. 3, a low frequency loop-filter 35 and a high frequency loop-filter 36 are provided in the closed loop of the PLL circuit 25. Those loop-filters 35 and 36 enable the PLL circuit 25 to be locked to a retrieved signal received as an input. In general, a PLL circuit cannot be locked to all frequencies of an input signal, but can only handle an input signal within a certain frequency range. However, a retrieved signal from an MCAV optical disk has a relatively wide range of frequencies, which is difficult for only one PLL circuit to handle. If a PLL circuit is forced to handle this wide frequency range, that will give rise to a problem in the stability and the noise response of the PLL circuit. Thus, in the preferred embodiment of the present invention, two loop-filters, i.e., a low frequency loop-filter and a high frequency loop-filter, are provided for the PLL circuit 25, and, by switching those two loop-filters according to zone information, the PLL circuit 25 can be locked to a wide frequency range of retrieved signals.

Figure 4:
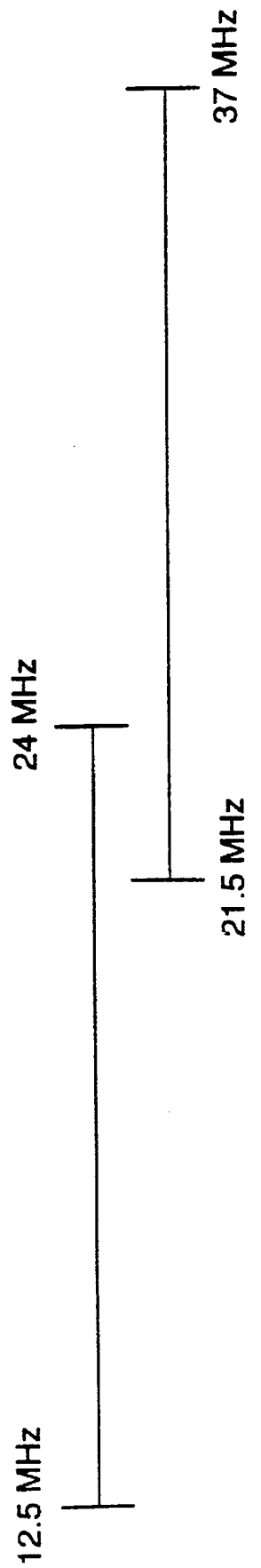
FIG. 4 is an illustrative drawing for showing an effect of the two loop-filters in the PLL circuit according to the present invention.

The effect of introducing the two loop-filters is shown in FIG. 3. FIG. 4 schematically shows the two frequency ranges which can be locked by the PLL circuit 25. The first frequency range shown on the left in FIG. 4 means that when the PLL circuit 25 starts with a signal within this first frequency range provided at an internal input node of the phase comparator 33 while using the low frequency loop-filter 35, the PLL circuit 25 can lock itself to a retrieved signal frequency of 17.4 MHz, which corresponds to the frequency of the innermost side of the disk. The second frequency range shown on the right in FIG. 4 means that when the PLL circuit 25 starts with a signal within this second frequency range provided at an internal input node of the phase comparator 33 while using the high frequency loop-filter 36, the PLL circuit 25 can lock itself to a retrieved signal frequency of 27.84 MHz, which corresponds to the frequency of the outermost side of the disk. As can be seen in FIG. 4, the first and second frequency ranges have some overlaps from 21.5 MHz to 24 MHz. Thus, if the PLL circuit 25 starts with an initial frequency falling within this overlapping area, the PLL circuit 25 with a switch between the two loop-filters can be locked to the highest frequency of the outermost side of the disk and to the lowest of the innermost side, i.e., it can be locked to any retrieved signal frequency over the entire disk.

The frequency dividing ratio of the frequency divider 38 shown in FIG. 3 is determined by the frequency dividing ratio generation circuit 28 shown in FIG. 2 on the basis of zone information or address information. In FIG. 3, if the frequency of a signal sent from the frequency divider 38 to the phase comparator 33 is significantly different from the frequency of a retrieved signal, the PLL circuit 25 may not be able to be adapted and locked to the retrieved signal frequency. By generating a signal with as close a frequency to a retrieved signal frequency as possible, the frequency divider 38 enables the PLL circuit 25 to handle with ease a retrieved signal frequency. The frequency dividing ratio need not be rigid, and the VCO 37 may be able to follow an input retrieved signal by oscillating within its frequency limit, even if the zone information provided for the frequency divider 28 is not accurate, and, thus, the resulting frequency dividing ratio includes some errors. However, since there are cases in which the VCO 37 is following an input retrieved signal nearly at its limit, the address information, if detected by the address detection circuit 30 in FIG. 2, should be used for deciding a frequency dividing ratio.

Figure 5:
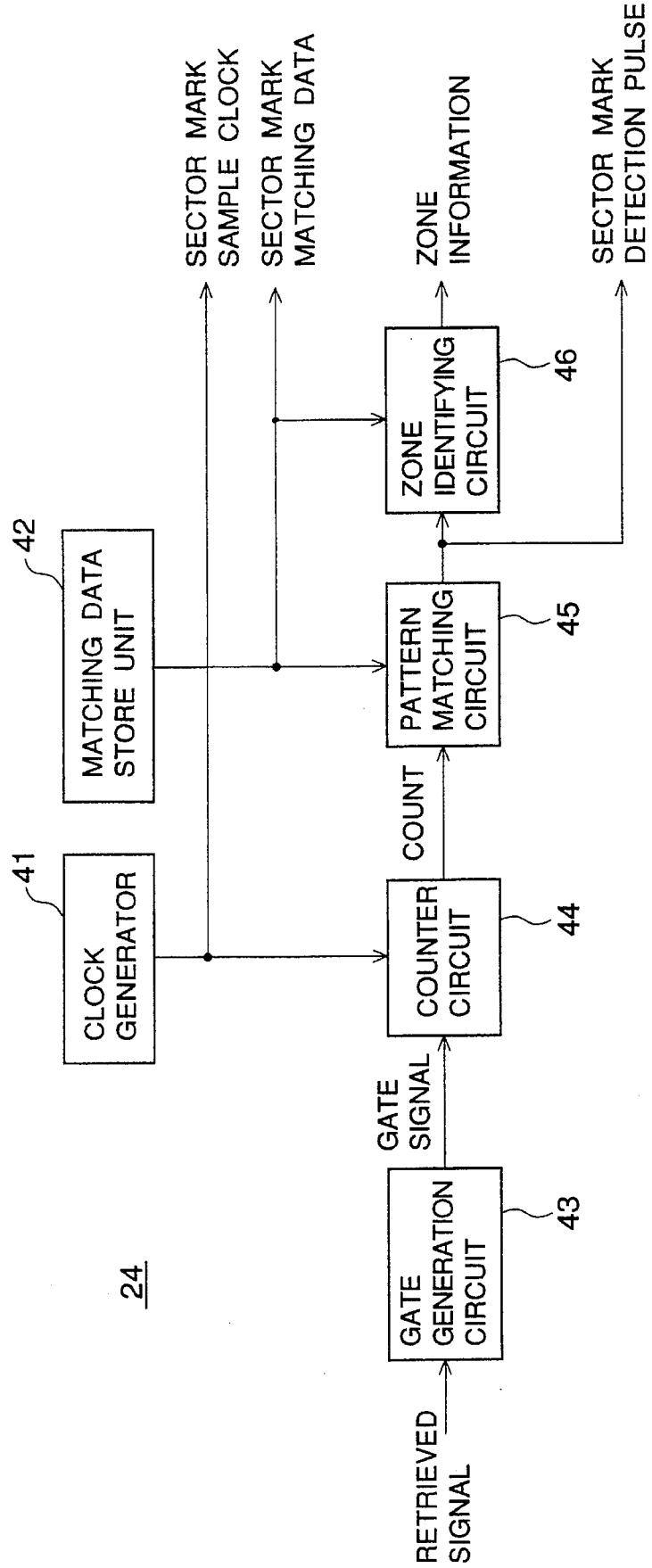
FIG. 5 is a block diagram of the sector mark detection circuit of FIG. 2.

A block diagram of the sector mark detection circuit 24 is shown in FIG. 5. A detailed description of this circuit is provided in U.S. patent application Ser. No. 08/150,216 (the disclosure of which is hereby incorporated by reference), and, thus, a description and a block diagram given herein are only schematic. In FIG. 5, the sector mark detection circuit 24 comprises a clock generator 41, a matching data store unit 42, a gate generation circuit 43, a counter circuit 44, a pattern matching circuit 45, and a zone identifying circuit 46.

In FIG. 5, a retrieved signal is provided for the gate generation circuit 43 for generating a plurality of gate signals which mark intervals between a different pair of pulses of a retrieved signal. For each gate signal, the counter circuit 44 counts sector sample clock pulses during the period of the gate signal. Each count measures a length of time between some two pulses of the retrieved signal, and the collection of all the counts can feature the retrieved signal. The pattern matching circuit 45 compares this collection of the counts with matching data provided by the matching data store unit 42, and provides a sector mark detection pulse indicative of their match, i.e., the existence of a sector mark. Finally, a zone identifying circuit 46 identifies the current zone position on the basis of the matching data.

Figure 6:
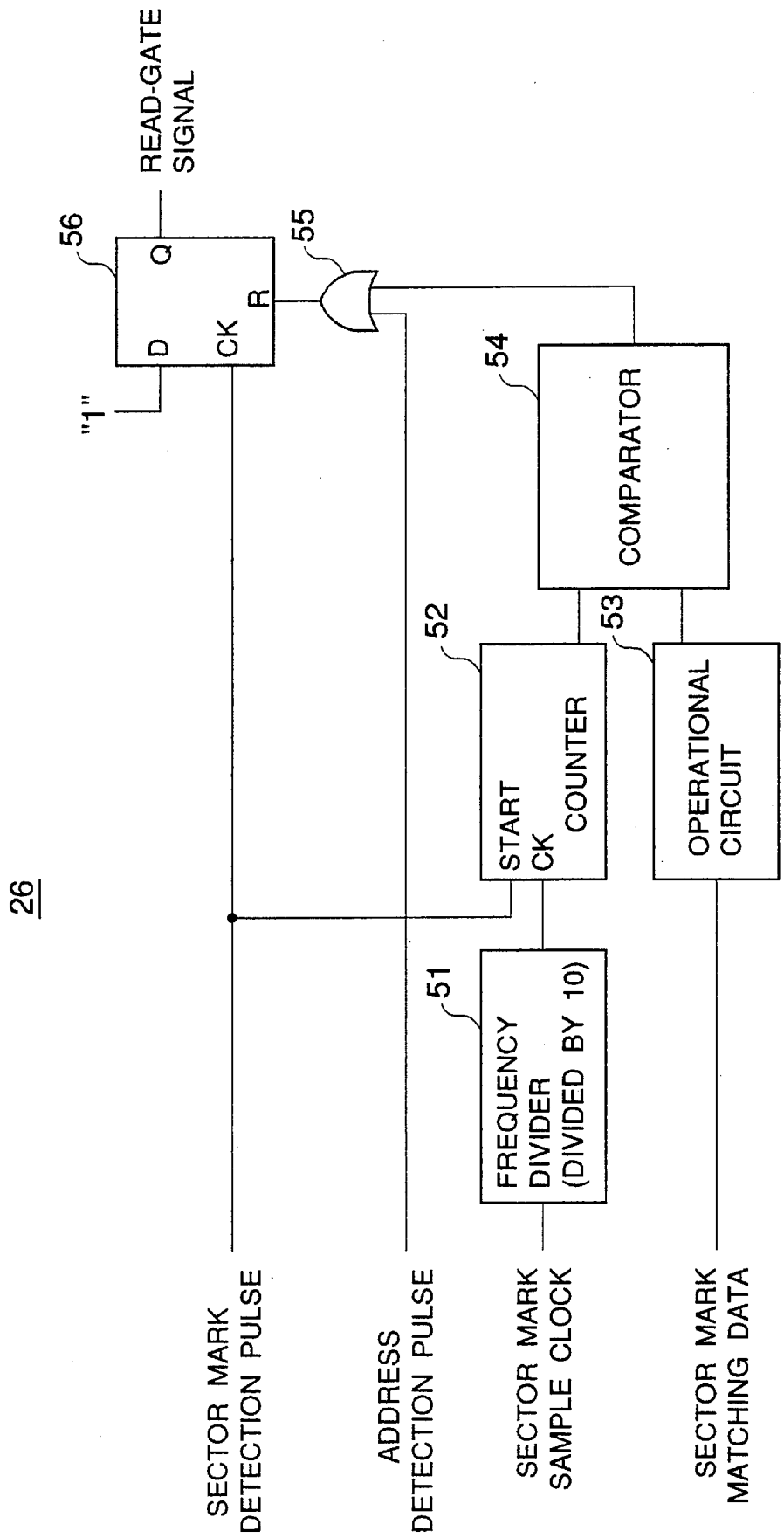
FIG. 6 is a block diagram of the read-gate detection circuit.

A block diagram of the read-gate generation circuit 26 is shown in FIG. 6. The read-gate generation circuit 26 comprises a frequency divider 51, a counter 52, an operational circuit 53, a comparator 54, an OR gate, and a latch 56. The read-gate generation circuit 26 receives a sector mark detection pulse, a sector mark sample clock, and a sector mark matching data from the sector mark detection circuit 24, and also receives an address detection pulse from the address detection circuit 30. When a sector mark detection pulse is received by the latch 56, the read-gate signal is set to enable. Then, when either an address detection pulse is received or a predetermined length of time has passed since the receipt of the sector mark detection pulse, the latch 56 is reset and the read-gate output is disabled. This predetermined length of time may be set to the sector mark length multiplied by a predetermined factor (10 in this embodiment). The sector mark length is provided by the sector mark matching data which corresponds to a count measuring a sector mark length generated by the counter circuit 44 of the sector mark detection circuit 24.

In FIG. 6, a sector mark detection pulse starts the counter 52, and time is measured with reference to a clock equal to a tenth of the sector mark sample clock. In this embodiment, the multiplier of the operational circuit 53 is one, and the outputs of the counter 52 and the operational circuit 53 are compared by the comparator 54. The two inputs to the comparator 54 become equal when the time length ten times that of the sector mark has passed since the start of the counter 52. At this point of time, the comparator 54 resets the latch 56 through the OR gate 55, and the read-gate output is closed even if the address is not detected. Thus, the read-gate generation circuit is prepared to receive a sector pulse, and is ready for the next sector. The time length used here may be changed by changing the multiplier of the operational circuit 53 or the frequency dividing ratio of the frequency divider 51.

With reference back to FIG. 2, a sequence from retrieving a signal from a sector to detecting the address will be described below. First, for the first sector encountered, the sector mark detection circuit detects the sector mark and generates zone information. Based on this zone information, the loop-filter switching circuit 27 selects an appropriate filter of the PLL circuit 25. The frequency dividing ratio generation circuit 28 is too slow to generate a frequency dividing ratio for the first sector in order for the ratio to be used by the PLL circuit 25. Thus, for the first sector, the frequency dividing ratio generation circuit 28 provides a frequency dividing ratio corresponding to the signal frequency of the middle point between the outermost side and the innermost side of the disk.

The PLL circuit 25 tries to lock itself to a retrieved signal by using an appropriate filter and the frequency dividing ratio for the middle point. However, there are cases in which the PLL circuit 25 succeeds and in which it fails, because the PLL circuit 25 starts with a frequency for the middle point for any optical head position. In successful cases, the PLL circuit 25 provides a data signal and a synchronizing clock for the address detection circuit 30, and, then, which detects the address of the first sector. The address detection circuit 30, then, outputs an address detection pulse which operates the switching part 29. Also, the frequency dividing ratio generation circuit 28 generates a frequency dividing ratio on the basis of the address information from the address detection circuit 30. This frequency dividing ratio is more accurate than that which, by this point of time, has been produced on the basis of the zone information. Thus, this more accurate frequency dividing ratio is provided for the PLL circuit 25 through the switching part 29, and is used for the sectors after the first.

In the cases that the PLL circuit fails to be locked, the address detection circuit 30 inevitably fails to detect the address. The frequency dividing ratio produced on the basis of the zone information by the frequency dividing ratio generation circuit 28 is selected by the switching part 29, and is provided for the PLL circuit 25. This frequency dividing ratio is used for the second sector encountered, and the address is detected for the second sector.

As described above, the disk drive according to the present invention can detect the address of the first sector over the entire optical disk by switching the loop-filter 35 and 36. Even if the address is not determined at the first sector, it can be detected at the next sector. The fact that the PLL circuit 25 can be locked to a retrieved signal frequency within a short period of time makes it possible to shorten VFO in order to increase the rotation rate of the disk or increase the number of sectors in each track.

In another embodiment of the present invention, for eliminating errors of sector mark detection, a masking circuit is introduced into the sector mark detection circuit 24 to suppress false sector mark detection pulses for a predetermined period after the detection of a sector mark. This is because there is only one sector mark in one sector and a certain period following sector mark detection should not include any detection pulses.

Figure 7:
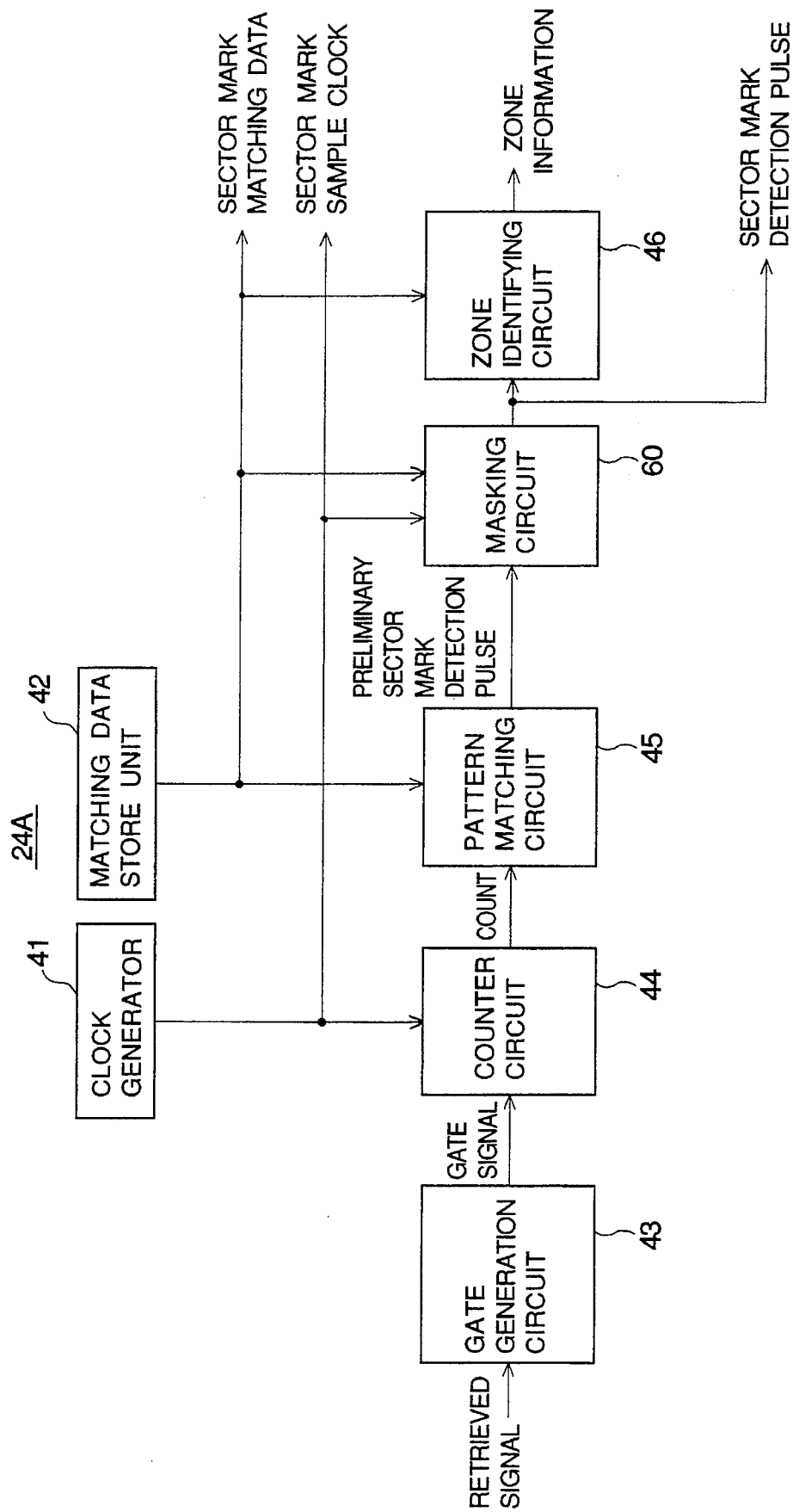
FIG. 7 is a block diagram of an alternate sector mark detection circuit according to the present invention.
Figure 8:
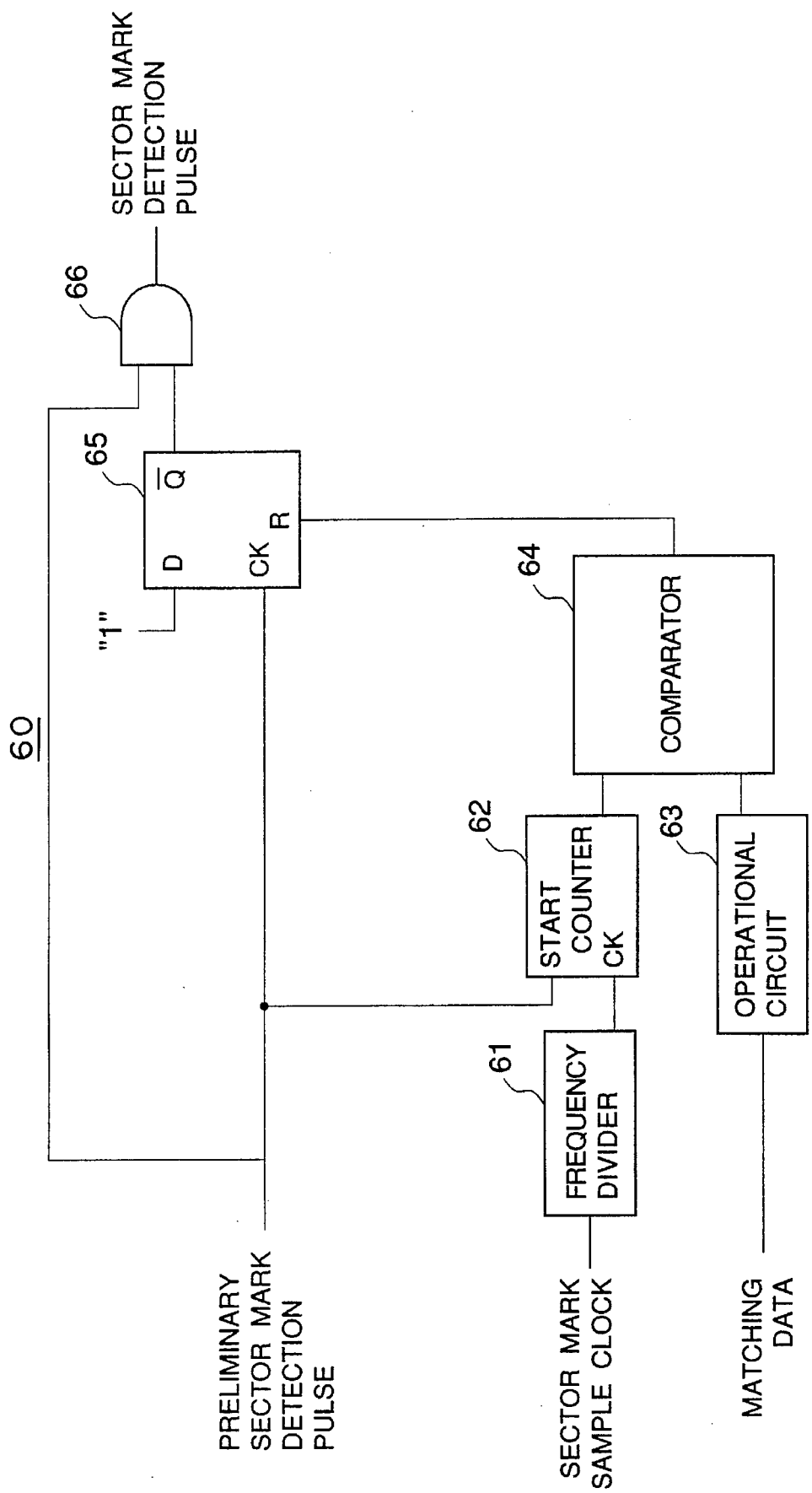
FIG. 8 is a block diagram of the masking circuit of the alternate sector mark detection circuit according to the present invention.

The alternative sector mark detection circuit 24A with a masking circuit 60 is shown in FIG. 7, and the block diagram of the masking circuit 60 is shown in FIG. 8. The alternate sector mark detection circuit 24A in FIG. 7 is the same as the sector mark detection circuit 24 in FIG. 5 except that the masking circuit 60 is inserted between the pattern matching circuit 45 and the zone identifying circuit 46. The masking circuit 60 receives a preliminary sector mark detection pulse from the pattern matching circuit 45, the sector mark sample clock from the clock generator 41, and the matching data from the matching data store unit 42.

In FIG. 8, the masking circuit 60 comprises a frequency divider 61, counter 62, an operational circuit 63, a comparator 64, a latch 65, and an AND gate 66. When a preliminary sector mark detection pulse is received by the latch 65 at its clock input, the output of the latch 65 becomes zero at the entailing edge of the preliminary sector mark detection pulse. Thus, the preliminary sector mark detection pulse gets through the AND gate 66 to the output end of the masking circuit 60. However, for a predetermined period following the first Preliminary sector mark pulse, the output of the latch 65 stays at zero, and, thus, the AND gate 66 does not allow other preliminary sector mark detection pulses to get through. Then, when a predetermined length of time has passed since the receipt of the preliminary sector mark detection pulse, the latch 65 is reset and the AND gate 66 is opened. This predetermined length of time may be set to a sector mark length multiplied by a predetermined factor. The sector mark length is provided by the matching data which corresponds to a count measuring a sector mark length generated by the counter circuit 44 of the sector mark detection circuit 24A.

In FIG. 8, a sector mark detection pulse starts the counter 62, and time is measured with reference to a clock which is generated by the frequency divider 61 and is equal to the sector mark sample clock divided by the predetermined factor. In this alternate embodiment, the multiplier of the operational circuit 63 is one, and the outputs of the counter 62 and the operational circuit 63 are compared by the comparator 64. The two inputs to the comparator 64 become equal when a time length equal to the predetermined factor times the time length of the sector mark has passed since the start of the counter 62. At this point of time, the comparator 64 resets the latch 65, and the AND gate 66 is opened.

Further, the present invention is not limited to these embodiments, but various variations and modifications may be made without departing from the scope of the present invention.

What is claimed is:

1. An optical disk drive for recording information on or reproducing information from an optical disk having a plurality of zones including a different number of sectors, said optical disk drive comprising:

zone-information generating means for generating zone information under a condition of absence of address information, said zone information representing only a current zone in which an optical head is located;

a phase locked loop circuit which generates a synchronizing signal and includes a plurality of loop filters having different frequency characteristics; and selecting means for selecting one of said plurality of loop filters only on the basis of said zone information from said zone-information generating unit, wherein said synchronizing signal is used for reading an address signal of a retrieved signal from said optical disk.

2. The optical disk drive as claimed in claim 1, wherein said zone information generating means comprises sector mark detecting means for detecting a sector mark of a sector in said current zone from the retrieved signal, said sector mark being recorded at the beginning of each sector.

3. The optical disk drive as claimed in claim 2, further comprising gate means for making said synchronizing signal generating means receive the retrieved signal only for a period of a first predetermined length starting from the detection of said sector mark.

4. The optical disk drive as claimed in claim 1, further comprising address detection means for detecting an address of a sector in said current zone from the retrieved signal synchronized with said synchronizing signal.

5. The optical disk drive as claimed in claim 1, wherein said plurality of loop filters includes a low-frequency filter and a high-frequency filter, said low-frequency filter having a capture range in lower frequencies than does said high frequency filter, said capture range being a frequency range able to be locked by a respective one of said loop filters.

6. An optical disk drive for recording information on or retrieving information from an optical disk having a plurality of zones including a different number of sectors, said optical disk drive comprising:

zone identifying means for identifying a current zone in which an optical head is located;

synchronizing signal generating means for generating a synchronizing signal of a frequency corresponding to said current zone, said synchronizing signal being used for reading a retrieved signal from the optical disk, wherein said zone identifying means comprises sector mark detecting means for detecting a sector mark of a sector in said current zone from the retrieved signal, said sector mark being recorded at the beginning of each sector, and further comprising gate means for making said synchronizing signal generating means receive the retrieved signal only for a period of a first predetermined length starting from the detection of said sector mark, wherein said sector mark detecting means detects the length of the sector mark, and said first predetermined length is proportional to said length of the sector mark.

7. An optical disk drive for recording information on or retrieving information from an optical disk having a plurality of zones including a different number of sectors, said optical disk drive comprising:

zone identifying means for identifying a current zone in which an optical head is located;

synchronizing signal generating means for generating a synchronizing signal of a frequency corresponding to said current zone, said synchronizing signal being used for reading a retrieved signal from the optical disk, wherein said zone identifying means comprises sector mark detecting means for detecting a sector mark of a sector in said current zone from the retrieved signal, said sector mark being recorded at the beginning of each sector, and further comprising gate means for making said synchronizing signal generating means receive the retrieved signal only for period of a first predetermined length starting from the detection of said sector mark, wherein said sector mark detecting means includes masking means for preventing said sector mark detecting means from detecting sector marks for a period of a second predetermined length starting from the detection of said sector mark.

8. The optical disk drive as claimed in claim 7, wherein said sector mark detecting means detects the length of the sector mark, and said second predetermined length is proportional to said length of the sector mark.

* * * * *